United States Patent [19]
Wang et al.

[11] Patent Number: 5,630,968
[45] Date of Patent: May 20, 1997

[54] WATER-INJECTION FOAMING DEVOLATILIZING METHOD

[75] Inventors: Ning-He Wang; Noriaki Hashimoto, both of Hiroshima, Japan

[73] Assignee: The Japan Steel Works, Ltd., Tokyo, Japan

[21] Appl. No.: 474,724

[22] Filed: Jun. 7, 1995

[51] Int. Cl.[6] .................................................. B29C 44/00
[52] U.S. Cl. ........................... 264/53; 264/51; 425/208; 425/812
[58] Field of Search ...................... 264/51, 53; 425/205, 425/208, 812

[56] References Cited

U.S. PATENT DOCUMENTS

| 3,668,161 | 6/1972 | Nauman et al. | 264/53 |
| 4,940,329 | 7/1990 | Dienst | 425/208 |
| 5,141,426 | 8/1992 | Capelle | 425/205 |
| 5,147,198 | 9/1992 | Capelle | 425/208 |
| 5,221,504 | 6/1993 | Capelle | 425/208 |

Primary Examiner—Allan R. Kuhns
Attorney, Agent, or Firm—Sughrue, Mion, Zinn, Macpeak & Seas

[57] ABSTRACT

A water-injection foaming devolatilizing method includes the steps of: melting and kneading a polymer in a water-injection dispersing zone of an extruder having a screw; injecting water into a polymer melt so as to be dispersed into the polymer melt which is being kneaded; and vaporizing volatile components contained in the polymer melt together with water in a devolatilizing zone having a vent port and located on a downstream side of the water-injection dispersing zone, so that the volatile components are removed and discharged through the vent port. A pressure-reducing expansion zone is provided between the water-injection dispersing zone and the devolatilizing zone so as to be upstream of the vent port. The method further includes gradually reducing a pressure in the pressure-reducing expansion zone so that not only bubbles in the water which is dispersed into the polymer melt are made to grow up, but also the bubbles are broken down at a downstream end portion of the pressure-reducing expansion zone.

2 Claims, 4 Drawing Sheets

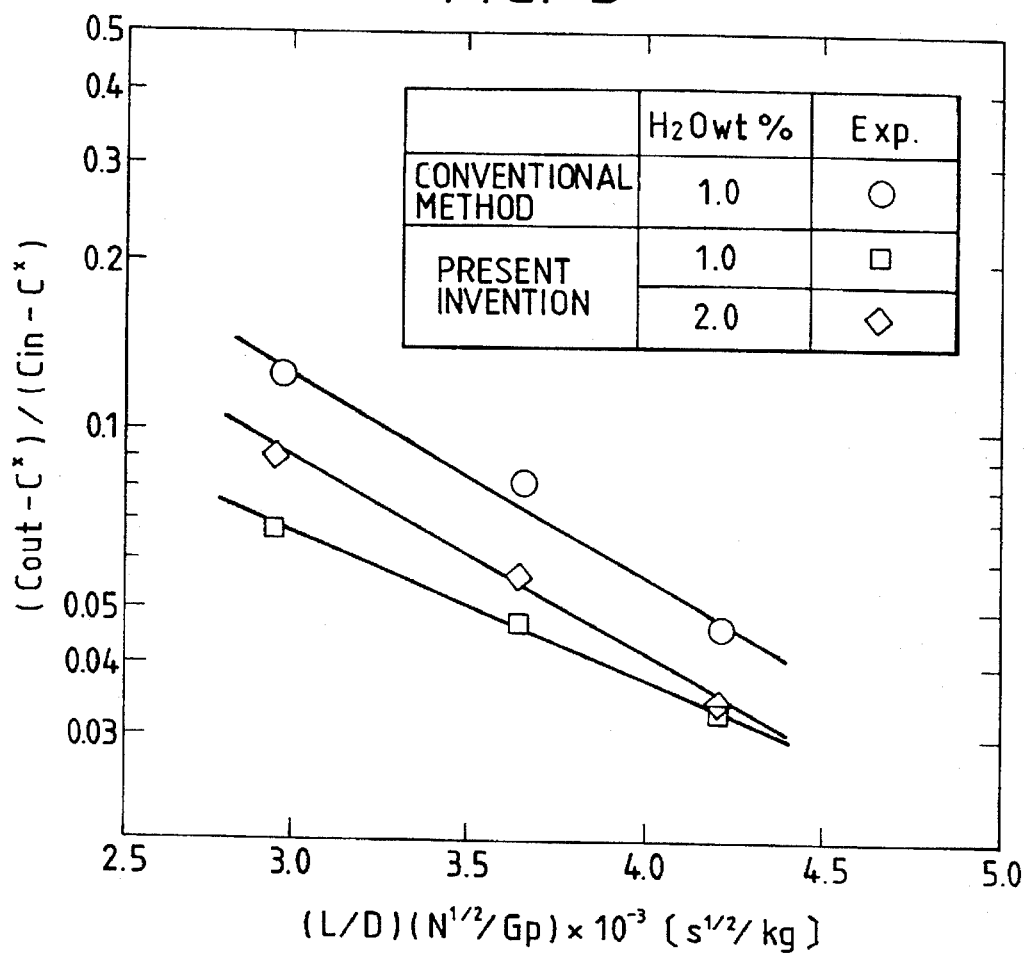

FIG. 5

Cin: DEVOLATIZING COMPONENT CONCENTRATION IN POLYMER MELT BEFORE DEVOLATILIZATION

Cout: DEVOLATIZING COMPONENT CONCENTRATION IN POLYMER MELT AFTER DEVOLATILIZATION C*: AIR BUBBLES IN POLYMER MELT/EQUILIBRIUM CONCENTRATION OF DEVOLATIZING COMPONENT ON POLYMER SURFACE

L/D: SCREW LENGTH/SCREW DIAMETER

N: SCREW ROTATION SPEED

Gp: QUANTITY OF PROCESSED POLYMER

WATER-INJECTION FOAMING DEVOLATILIZING METHOD

BACKGROUND OF THE INVENTION

1. Field of the Invention

The present invention relates to a water-injection foaming devolatilizing method and apparatus for a polymer and, more particularly, to a novel improvement for efficiently removing volatile components from a polymer melt.

2. Related Art

Heretofore, as this type of water-injection foaming devolatilizing method and apparatus, there is generally used an extruder having such a configuation as shown in FIG. 6.

That is, in FIG. 6, the reference numeral 1 designates a casing of a twin screw type extruder 2, in which a water-injection port 3 and a vent port 4, on the downstream side of the water-injection hole 3, are provided on the upper surface of this casing 1, and a pair of screws 5 are rotatably provided in the cylinder 1 of the extruder 2 so as to be intermeshed with each other while overlapping each other.

In the aforementioned cylinder 1, a water-injection dispersing zone 10 having the aforementioned water-injection port 3, and a devolatilizing zoner 11 having the vent port 4 in the downstream side thereof are formed.

Part of the aforementioned screws 5 in the aforementioned water-injection dispersing zone 10 is constituted by a first ring 12, a plurality of kneading/dispersing screws 13, and a second ring 14. Part of the screws 5 in the devolatilizing zone 11 is constituted by a full flight screw 5a.

Next, in the aforementioned conventional configuration, under the condition that a polymer melt 20 is melted, kneaded and extruded by the screws 5, water 3a injected through the water-injection port 3 is dispersed, under a high pressure by the kneading/dispersing screws 13, into the high-temperature polymer melt 20 with which the water-injection dispersing zone 10 is filled. Further, this high pressure is maintained by the extruding function of the screw 5 in the upstream side of the first ring 12 and by the damming function of the second ring 14, so that the pressure is higher than the saturated vapor pressure of the water 3a which is dispersed into the high-temperature polymer melt 20. Accordingly, the water 3a is dispersed as liquid particles into the polymer melt 20. When the polymer melt 20 passes through the second ring 14, the pressure of the polymer melt 20 is reduced suddenly so that the water 3a dispersed into the polymer melt 20 is vaporized to thereby cause sudden foaming because the devolatilizing zone 11 at the downstream side of the second ring 14 is in a vacuum state. In this occasion, volatile components contained in the polymer melt 20 begin to be diffused into bubbles through a bubble/polymer interface from a point of time when a foaming phenomenon appears. Further, the bubbles in the foamed polymer melt 20 are broken down by the shearing function of the screws 5 in the devolatilizing zone 11 which is at the downstream side of the second ring 14. As a result, the volatile components contained in the bubbles are diffused to the outside of the polymer melt 20 and discharged to the outside from the vent port 4.

Because the conventional water-injection foaming devolatilizing method and apparatus is configured as described above, there are problems as follows. That is, as shown in FIG. 7, the pressure P of the polymer melt in the water-injection dispersing zone is reduced suddenly after the polymer melt passes through the second ring in the downstream side.

Accordingly, the generation, growth and breakdown of bubbles due to vaporization of water dispersed in the polymer melt mainly occur when the polymer melt passes through the second ring. Accordingly, the bubbles do not grow up sufficiently, so that the residence time thereof is short. As a result, not only the area of the bubble/polymer interface as a diffusive area concerning devolatilizing efficiency is relatively small but also the residence time of bubbles as a diffusive time is short, such that breakdown is not performed sufficiently.

Further, because the water dispersed into the polymer melt takes heat from the polymer melt around the water suddenly when the water is vaporized, the temperature of the interface film portion of the polymer melt around the generated bubbles becomes locally considerably lower than the temperature of the polymer melt, that is, the temperature of the interface film portion gets into a supercooling state. As a result, the diffusive velocity of volatile components which are diffused through this film layer is lowered.

Further, because the generation, growth and breakdown of bubbles occur concentratedly suddenly in a short time after the polymer melt passes through the secondring, there arises easily an entrainment phenomenon in which polymer splits are generated and absorptively discharged from the vent port.

SUMMARY OF THE INVENTION

The present invention is designed to solve the aforementioned problems and particularly has an object to provide a water-injection foaming devolatilizing method and apparatus which is configured so that volatile components are efficiently removed from a polymer melt.

The water-injection foaming devolatilizing method according to the present invention is a water-injection foaming devolatilizing method in which, in a water-injection dispersing zone of an extruder having a screw, water is injected to a kneaded polymer melt so as to be dispersed into the polymer melt which is being kneaded, and, in a devolatilizing zone in the downstream side of the water-injection dispersing zone, volatile components contained in the polymer melt are vaporized and removed together with the water, wherein a pressure-reducing expansion zone is provided between the water-injection dispersing zone and the devolatilizing zone, so that not only bubbles in the water dispersed into the polymer melt are made to grow up, but also the bubbles are broken down at the downstream end portion of the pressure-reducing expansion zone.

In more detail, it is a method wherein treatment for the polymer in the water-injection dispersing zone, the pressure-reducing expansion zone and the devolatilizing zone is repeatedly carried out a plurality of times in one extruder.

The water-injection foaming devolatilizing apparatus according to the present invention is configured such that in an extruder which comprises: a cylinder provided with one combination which is, or a plurality of combinations each of which is, constituted by a water-injection port and a vent portion the downstream side of the water-injection port, the water-injection port and the vent port being disposed, at an interval therebetween, between the raw material supply port in an upstream end portion and a discharge port in the downstream end portion; and screws which are inserted into the inner hole of the cylinder so as to be rotatable; kneading/dispersing screws are arranged in the portion which is provided between the water-injection port and the vent port in the downstream side of the water-injection port and which contains the water-injection port, pressure-reducing rings are arranged in the downstream side of the kneading/ dispersing screws, and a full flight screw is arranged in the portion which is in the downstream side of the pressure-reducing rings and which contains the vent port.

In more in detail, the apparatus is configured such that each of the pressure-reducing rings is constituted by a column portion, and a disk with a plurality of slits in the downstream side of the column portion.

In the water-injection foaming devolatilizing method and apparatus according to the present invention, the pressure-reducing expansion zone is formed between the water-injection dispersing zone and the devolatilizing zone, so that the pressure of the polymer melt which is under a high pressure is reduced gradually. That is, by reducing pressure intermediately in the pressure-reducing expansion zone, bubbles in the polymer melt can grow up appropriately, so that the residence time thereof can be maintained appropriately.

Accordingly, the diffusive area of a bubble/polymer interface in the polymer melt becomes large, so that the diffusive time of volatile components is prolonged correspondingly to the residence time of the bubbles.

Further, the bubbles are broken down at their maximum by the pressure-reducing rings in the downstream side so that the volatile components contained in the bubbles are effectively diffused to the outside of the polymer melt. Accordingly, the devolatilizing efficiency of the extruder can be improved. Further, by the gradual pressure reduction, the pressure reduction is relaxed after the bubbles pass through the pressure-reducing rings, so that the occurrence of polymer splitting is prevented. Accordingly, an entrainment phenomenon is relaxed.

BRIEF DESCRIPTION OF THE DRAWINGS

FIG. 5 is a characteristic diagram of devolatilization;

DETAILED DESCRIPTION OF THE PREFERRED EMBODIMENTS

A preferred embodiment of a water-injection foaming devolatilizing method and apparatus according to the present invention will be described below in detail with reference to the drawings, in which parts the same as or equivalent to those in the prior art are referenced correspondingly.

Figure 1:
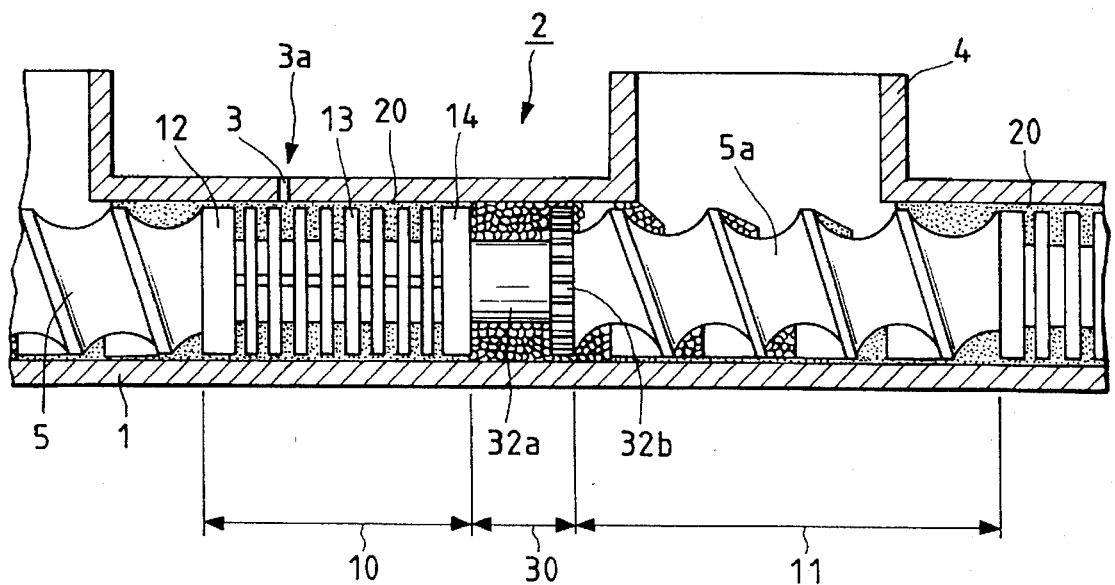
FIG. 1 is a sectional view showing an apparatus which is applied to a water-injection foaming devolatilizing method according to the present invention.
Figure 2:
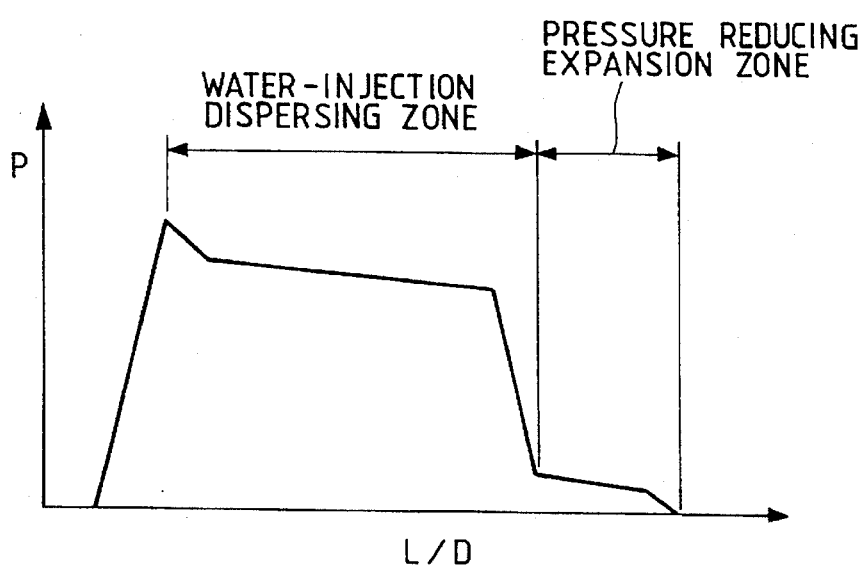
FIG. 2 is a characteristic graph of pressure of a polymer melt in the water-injection foaming devolatilizing method according to the present invention.
Figure 3:
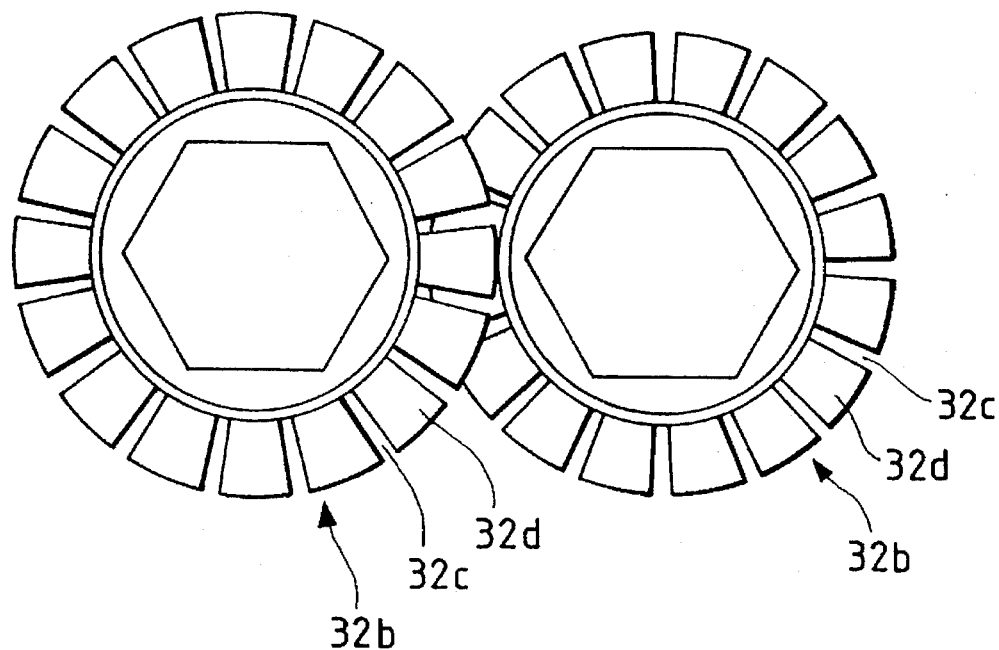
FIG. 3 is a configuration view showing pressure-reducing rings according to the present invention.
Figure 4:
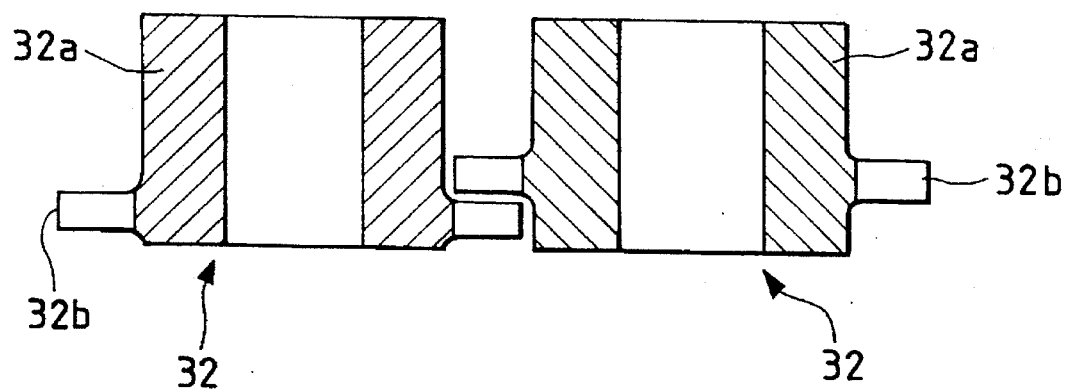
FIG. 4 is a side sectional view of FIG. 3.

FIG. 1 is an axial sectional view of an apparatus (extruder) for performing water-injection foaming devolatilizing according to the present invention; FIG. 2 is a pressure characteristic graph; FIG. 3 is a configuration view showing a pressure-reducing ring; FIG. 4 is a side sectional view of FIG. 3; and FIG. 5 is a characteristic graph of a devolatitizing test.

In FIG. 1, the reference numeral 1 designates a cylinder of a twin screw type extruder 2, in which a water-injection port 3 and a vent port 4, on the downstream side of the water-injection port 3, are provided on the upper surface of this casing 1 and in which a pair of screws 5 are rotatably provided in the cylinder 1 of the extruder 2 so as to be intermeshed with each other while overlapping each other.

In the aforementioned cylinder 1, a water-injection dispersing zone 10 having the aforementioned water-injection port 3, a pressure-reducing expansion zone 30, and a devolatilizing zone 11 having the vent port 4 are formed successively toward the direction. A portion of the aforementioned screws 5 in the aforementioned water-injection dispersing zone 10 is constituted by a first ring 12, a plurality of kneading/dispersing screws 13, and a second ring 14. A portion of the screws 5 in the aforementioned pressure-reducing expansion zone 30 is constituted by pressure-reducing rings 32. A portion of the screws 5 in the devolatilizing zone 11 is constituted by a full flight screw 5a. As shown in FIGS. 3 and 4, each of the aforementioned pressure-reducing rings 32 is constituted by a small-diameter column portion 32a having a diameter smaller than the diameter of the aforementioned second ring 14, and a ring portion 32b. The pressure-reducing rings 32 are rotatably provided in pairs so as to overlap each other. Each of the pressure-reducing rings 32 is configured so that a plurality of radial slits 32c and a plurality of teeth 32d are formed alternately in the ring portion 32b.

Incidentally, the shape of the slits formed in the ring portions 32b of the aforementioned pressure-reducing rings 32 are not limited to such a radial shape. For example, the slits may be formed into a linear shape or a curve shape in a circumferential direction or an arbitrary direction. Further, it is not always necessary that the slits are opened in the outer circumference of the ring portions 32b.

Next, the case where devolatilization is practically performed in the aforementioned configuration of the present invention will be described. First, under the condition that a polymer melt 20 is melted, kneaded and extruded by the screws 5, water 3a injected through the water-injection port 3 is dispersed, under a high pressure by the kneading/ dispersing screws 13, into the high-temperature polymer melt 20 with which the water-injection dispersing zone 10 is filled. Further, this high pressure is maintained by the extruding function of the screw 5 in the upstream side of the first ring 12 and by the damming function of the second ring 14, so that the pressure is higher than the saturated vapor pressure of the injected water 3a which is dispersed into the high-temperature polymer melt 20. Accordingly, the water 3a is dispersed as liquid particles into the polymer melt 20. The polymer melt 20 which has passed through a slight gap between the inner hole of the cylinder 1 and the second ring 14 flows into the pressure-reducing expansion zone 30.

The pressure-reducing expansion zone 30 communicating with the devolatilizing zone 11 of a vacuum state through the slits 32c of the ring portions 32b of the pressure-reducing rings 32 is in a decompressed state in which the pressure of the pressure-reducing expansion zone 30 is higher than the pressure of the devolatizing zone 11 but lower than the pressure of the aforementioned water-injection dispersing zone 10.

Accordingly, because there is no kneading function suffered, bubbles generated in the polymer melt 20 in this pressure-reducing expansion zone 30 by vaporization of water grow up appropriately greatly so that the residence time thereof can be maintained appropriately.

Accordingly, in the pressure-reducing expansion zone 30 having the pressure-reducing rings 32, the diffusive area of the bubble/polymer interface in the polymer melt 20 is large, so that the diffusive time of volatile components becomes long due to the residence time of the bubbles, and a large quantity of the volatile components contained in the polymer melt 20 are diffused into the bubbles. Further, the bubbles are expanded at their maximum and broken down by passing through the slits 32c of the ring portions 32b provided in the downstream side thereof, so that the volatile components in the bubbles are effectively diffused into a vacuum outside the polymer melt 20. Further, because the pressure reduction is performed gradually in the order of the water-injection dispersing zone 10, the pressure-reducing expansion zone 30 and the devolatilizing zone 11, a local supercooling phenomenon in the polymer melt 20 due to vaporization of water 3a can be relaxed. Furthermore, because the pressure change occurs gradually, no explosive breakdown of the generated bubbles occurs, so that an entrainment phenomenon is relaxed greatly.

Upon flowing out into the devolatilizing zone 11 after the expansion and breakdown of the bubbles through the slits 32c of the aforementioned pressure-reducing rings 32, the polymer melt 20 is kneaded by the screw 5a, and not only the bubbles are further broken doom but also the inside of the polymer melt 20 is exposed to a vacuum so that the volatile components are removed and discharged.

Accordingly, by setting the aforementioned pressure-reducing expansion zone 30, there can be obtained remarkable effects as follows.

(1) When the polymer melt 20 from the water-injection dispersing zone 10 enters the pressure-reducing expansion zone 30, the sectional area or free volume of the flow path thereof is enlarged by a small-diameter column portion 32a to thereby make it possible that bubbles in the polymer melt 20 grow up and that the area of the bubble/polymer interface can be increased.

(2) By reduction of the flow rate in the direction of the screw axis of the polymer melt 20 in accordance with the aforementioned paragraph (1), the residence time of the growing bubbles or the lifetime of the bubbles can be prolonged appropriately.

(3) By the prolongation of the residence time of the bubbles in accordance with the aforementioned paragraph (2), the time required for heating is given so that the temperature of the bubble/polymer melt 20 interface layer which is supercooled by vaporization of water is recovered to the temperature of the polymer melt 20.

(4) By setting the sectional area of the flow path in the small-diameter column portions 32a of the pressure-reducing rings 32, the pressure in the pressure-reducing expansion zone 30 is set so that the sudden change of the pressure downstream of the second ring 14 can be relaxed.

(5) The growing bubbles are expanded and broken down appropriately at their maximum by the ring portions 32b in the downstream side, so that the area of a free surface exposed to a vacuum in the devolatilizing zone 11 can be increased.

By providing a plurality of combinations each constituted by the aforementioned water-injection dispersing zone 10, pressure-reducing expansion zone 30 and devolatilizing zone 11, the devolatilizing effect can be made greater.

Further, although the aforementioned embodiment has been described upon a twin-screw extruder, the same effect can be obtained even by applying the same method and apparatus to a single extruder.

Next, an experimental example which has been actually carried out by the applicant of the present invention will be described.

EXAMPLE

Figure 6:
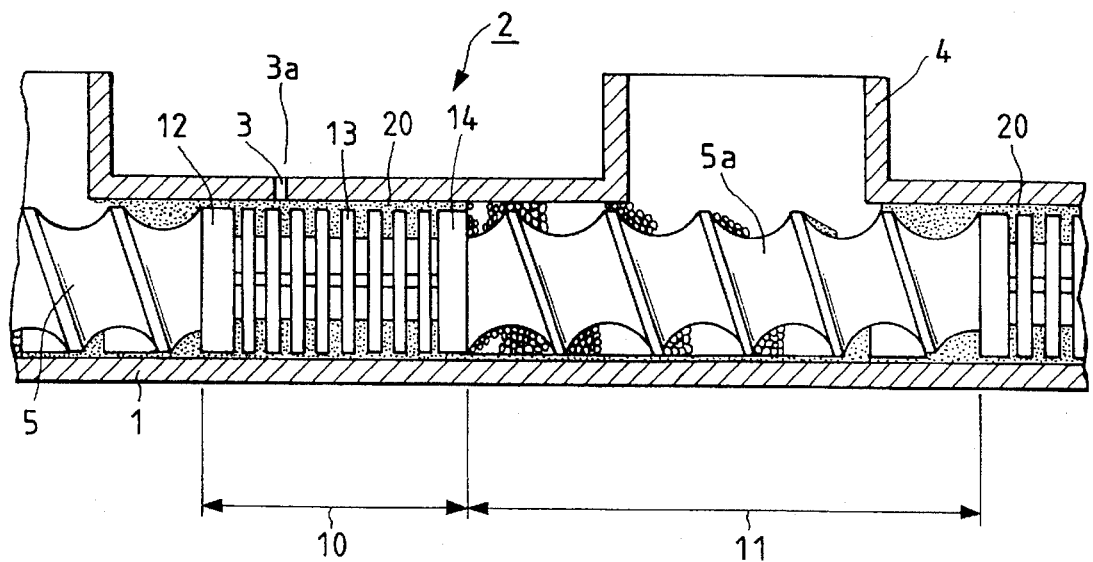
FIG. 6 is a sectional view showing a conventional apparatus.
Figure 7:
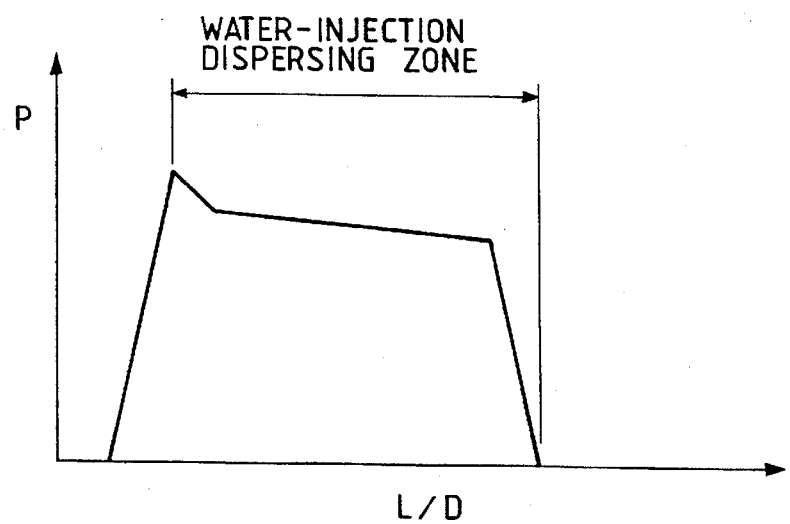
FIG. 7 is a characteristic graph of pressure in the conventional art.

An ethylbenzene/polystyrene solution prepared by using polystyrene as a polymer and ethylbenzene as a volatile component, respectively, was subjected to a devolatilization by two water-injection devolatilizing methods shown in FIGS. 1 and 6 under conditions of average devolatilizing operating temperature of 235° C. and devolatilizing zone 11 operating pressure of 10 torr in a deep-channel twin-screw extruder having a screw diameter of 65 mm and having 3-stage vents and under conditions shown in FIG. 5. As a result of the experiment shown in FIG. 5, the ethylbenzene content in the polystyrene solution obtained according to the method of the present invention, that is, the volatile concentration of the solution, could be reduced by 30–46% compared with the conventional method when the same polymer flow rate and the same screw speed were given. From this fact, it can be confirmed that the present invention is extremely effective in improvement of the devolatilizing efficiency of the screw extruder.

Because the water-injection foaming devolatilizing method and apparatus according to the present invention are configured as described above, the following effects can be obtained. That is, because the pressure-reducing expansion zone is provided between the water-injection dispersing zone and the devolatilizing zone, not only bubbles are made to grow up easily to thereby increase the area of the bubble/polymer interface but also the bubbles are broken down at their maximum by the ring portions of the pressure-reducing rings in the pressure-reducing expansion zone so that the volatile component therein is exposed and diffused into a vacuum. Accordingly, the devolatilizing effect can be improved more greatly compared with the prior art.

Further, the pressure of the polymer melt having water dispersed under a high pressure is reduced by these pressure-reducing rings to attain the prolongation of the residence time thereof to thereby make it possible to improve the devolatilizing effect. Accordingly, a local supercooling phenomenon for the polymer melt due to vaporization of water can be relaxed.

Further, because the sudden change of pressure is relaxed by the pressure-reducing rings, the entrainment which has occurred in the prior art can be reduced or prevented.

Further, as long as the L/D (length/diameter) of the screw and the flow rate of the polymer melt are constant, respectively, the volatile component content in the polymer melt in an outlet of the extruder can be reduced greatly. As long as the L/D of the screw and the volatile component content in the polymer melt in the outlet are constant, respectively, the quantity of processes polymer can be increased. Further, as long as the flow rate of the polymer and the volatile component content in the polymer melt in the outlet are constant, respectively, the L/D (length/diameter) of the screw can be reduced.

What is claimed is:

1. A water-injection foaming devolatilizing method, comprising the steps of:
   melting and kneading a polymer in a water-injection dispersing zone of an extruder having a screw;
   injecting water into a polymer melt so as to be dispersed into the polymer melt which is being kneaded; and
   vaporizing volatile components contained in the polymer melt together with water in a devolatilizing zone having a vent port and located on a downstream side of said water-injection dispersing zone, so that the volatile components are removed and discharged through the vent port, wherein a pressure-reducing expansion zone is provided between said water-injection dispersing zone and said devolatilizing zone so as to be upstream of the vent port, and further comprising gradually reducing a pressure in said pressure-reducing expansion zone so that bubbles in the water which is dispersed into said polymer melt are expanded to substantially their maximum size through a lack of kneading of said polymer melt in said pressure-reducing expansion zone and said bubbles are broken down at a downstream end portion of said pressure-reducing expansion zone by passing said polymer melt through slits in said downstream end portion.

2. The water-injection foaming devolatilizing method according to claim 1, wherein treatment for the polymer in said water-injection dispersing zone, said pressure-reducing expansion zone and said devolatilizing zone is repeatedly and sequentially carried out a plurality of times.

* * * * *